United States Patent [19]
Yoshino et al.

[11] 3,925,021
[45] Dec. 9, 1975

[54] APPARATUS COMPRISING A PLURALITY OF CHEMICALLY TREATED ABSORPTION PLATES FOR INJURIOUS GASES CONTAINED IN THE AIR

[75] Inventors: Masataka Yoshino; Hiroyasu Kuwazawa; Haruhiko Shimojima, all of Nakatsugawa; Osamu Tanaka, Amagasaki; Hideaki Kusakawa, Amagasaki; Hiromasa Matsuoka, Amagasaki; Mitsuo Maeda, Amagasaki, all of Japan

[73] Assignee: Mitsubishi Denki Kabushiki Kaisha, Tokyo, Japan

[22] Filed: June 14, 1974

[21] Appl. No.: 479,572

Related U.S. Application Data

[63] Continuation-in-part of Ser. No. 207,100, Dec. 13, 1971, abandoned.

[30] Foreign Application Priority Data
Dec. 28, 1970 Japan.............................. 46-126084
Dec. 28, 1970 Japan.............................. 46-126085
Mar. 22, 1971 Japan................................ 46-20135

[52] U.S. Cl.................... 23/252 R; 23/284; 55/278; 55/524; 55/73; 21/74 R; 423/242; 165/166; 165/180; 55/387
[51] Int. Cl.²........................................... B01J 1/00
[58] Field of Search .............. 23/252 R, 284, 288 P; 55/73, 524, 388; 21/74 R, 53

[56] References Cited
UNITED STATES PATENTS

| | | | |
|---|---|---|---|
| 907,180 | 12/1908 | Ryder et al. ........................ | 23/284 X |
| 1,490,588 | 4/1924 | Calder et al. ........................ | 55/73 X |
| 2,038,071 | 4/1936 | Wilhelm................................. | 55/278 |
| 3,507,627 | 4/1970 | Frant et al. .......................... | 23/288 F |
| 3,664,095 | 5/1972 | Asker et al. ........................ | 55/524 X |

*Primary Examiner*—James H. Tayman, Jr.
*Attorney, Agent, or Firm*—Wenderoth, Lind & Ponack

[57] ABSTRACT

Device for removing acidic and injurious gases such as a sulphur dioxide gas and a hydrogen sulfide gas or acid mist from the air comprising a plurality of absorption plates, spacing means positioned for maintaining the absorption plates apart to form a plurality of layers so as to pass air through the space between said layers. The absorption plates are hygroscopic and made of a material such as paper, asbestos paper, cloth or unwoven textile which is impregnated with an alkaline substance selected from the hydroxides and carbonates of alkali metals and alkaline earth metals such as potassium, sodium and calcium, and a hygroscopic wetting agent such as glycerine, ethylene glycol and propylene glycol so that the acidic and injurious gases or the acidic mist are neutralized by said alkaline substance. The device also comprises a plurality of such absorption plates and interposition plates. The interposition plates are interposed in the space between said absorption plates so as to guide two directional flows of air alternately into said space. As a further embodiment, the device comprises a plurality of said absorption plates and a heat-exchange element placed on the air-inlet side of said absorption plates. The heat-exchange element comprises a plurality of partition plates, and spacing means positioned for maintaining the partition plates apart, to form a plurality of layers so as to guide two directional flows of air alternately into the space between said layers. The interposition plates and the partition plates are made of the same material as used in the absorption plates.

4 Claims, 8 Drawing Figures

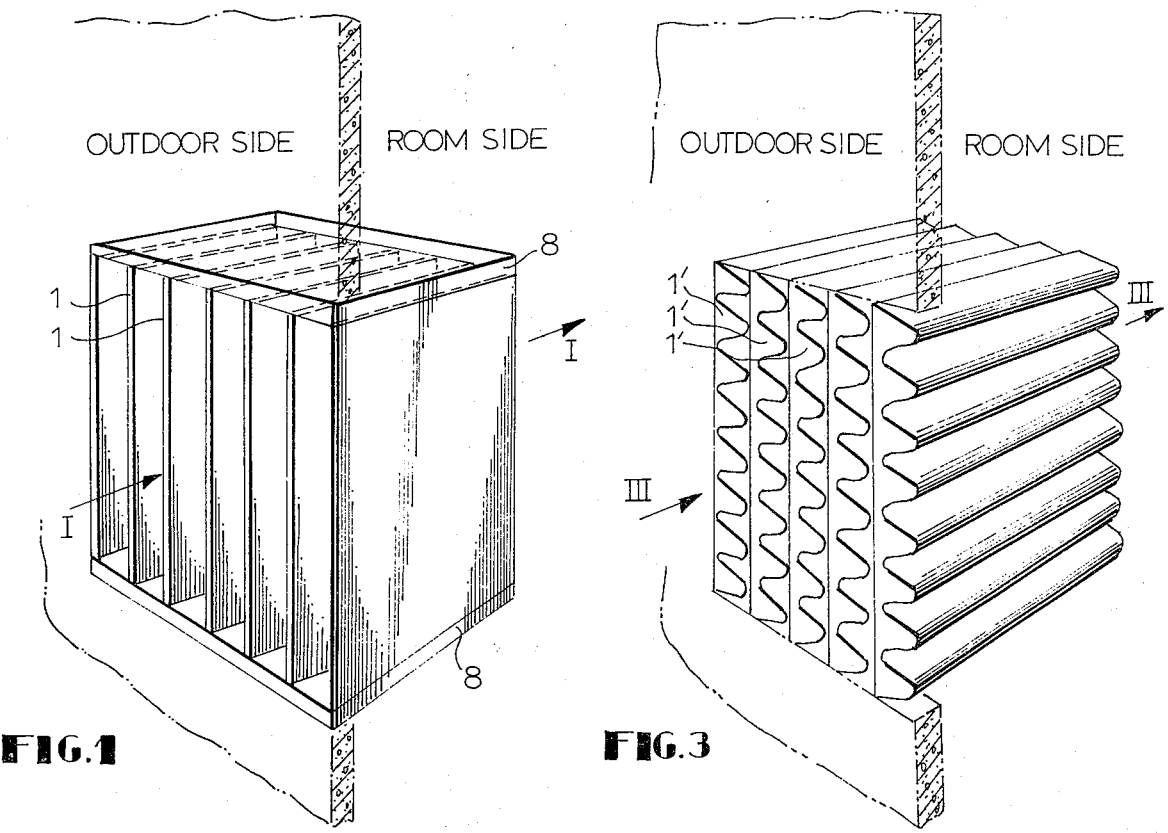
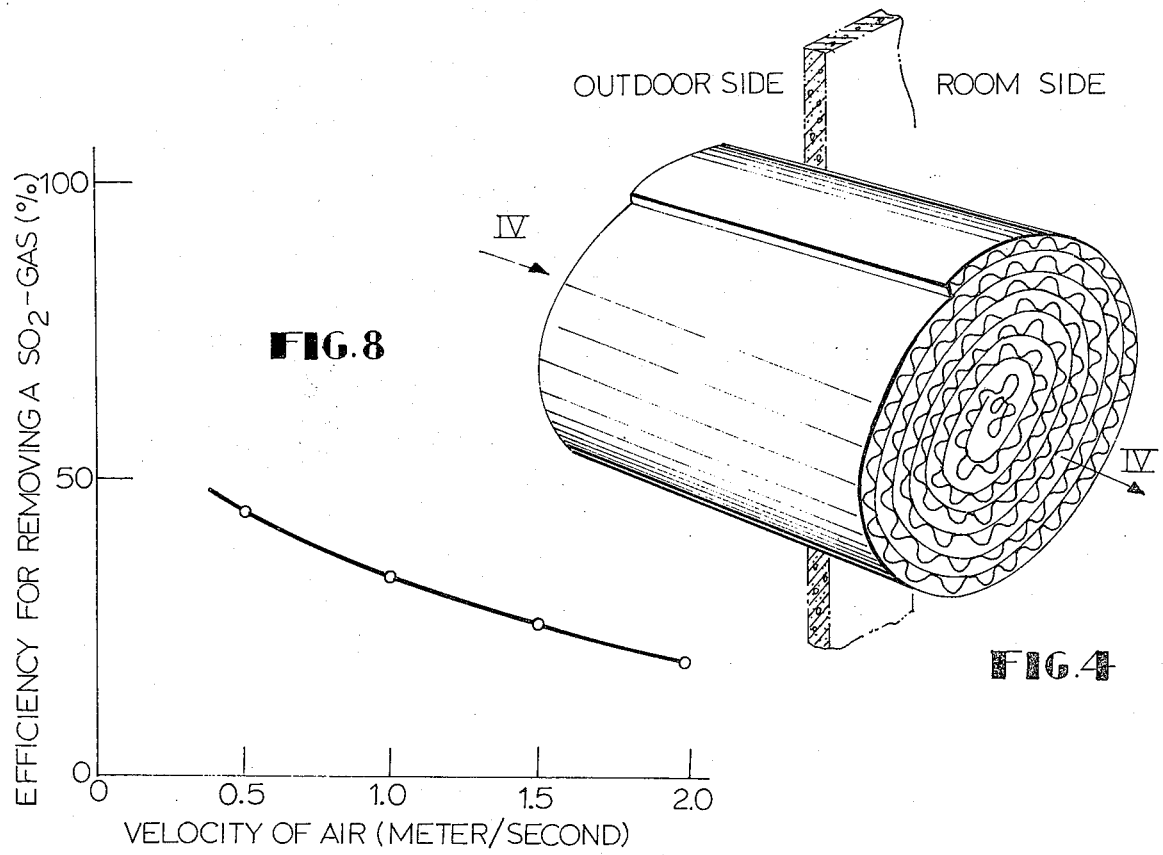

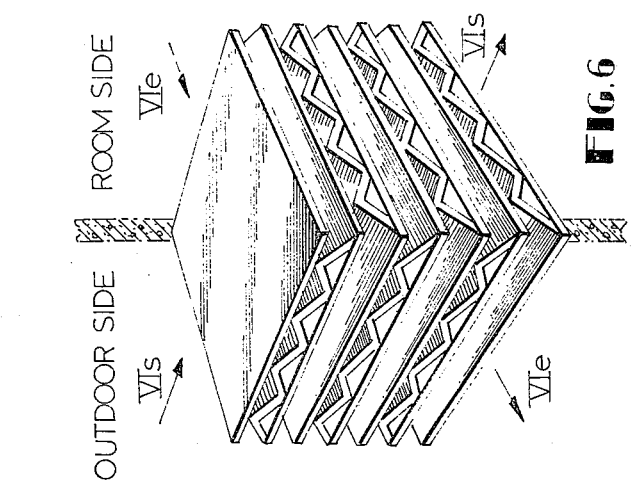
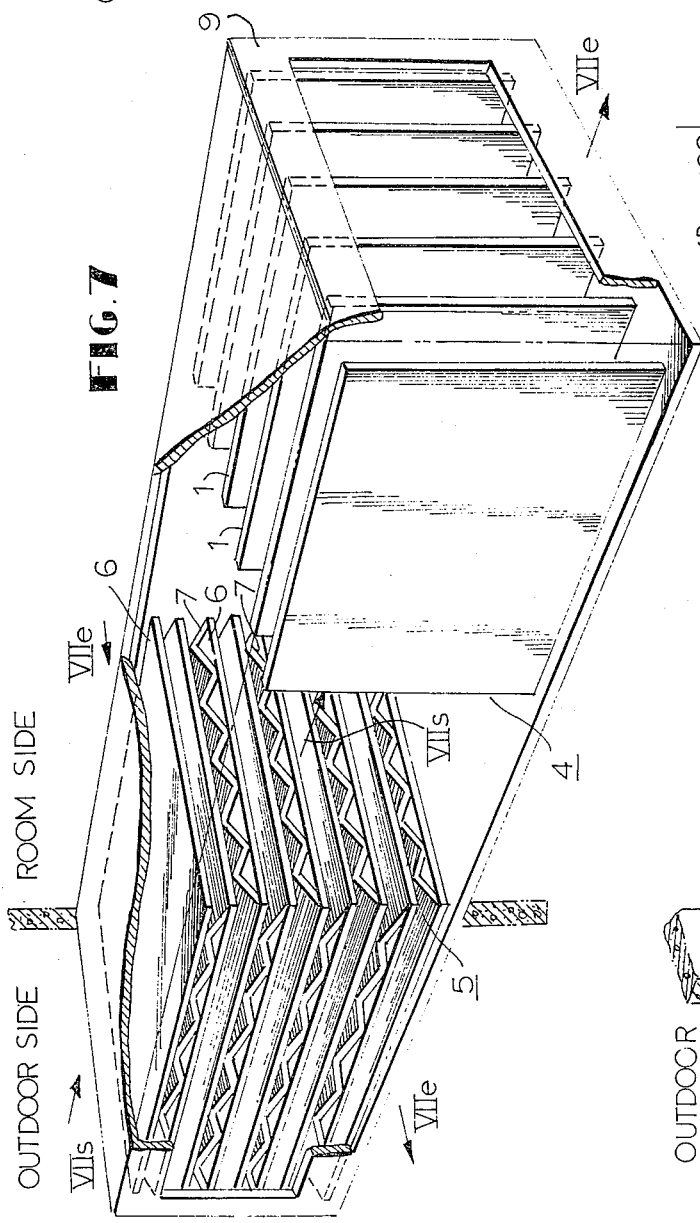
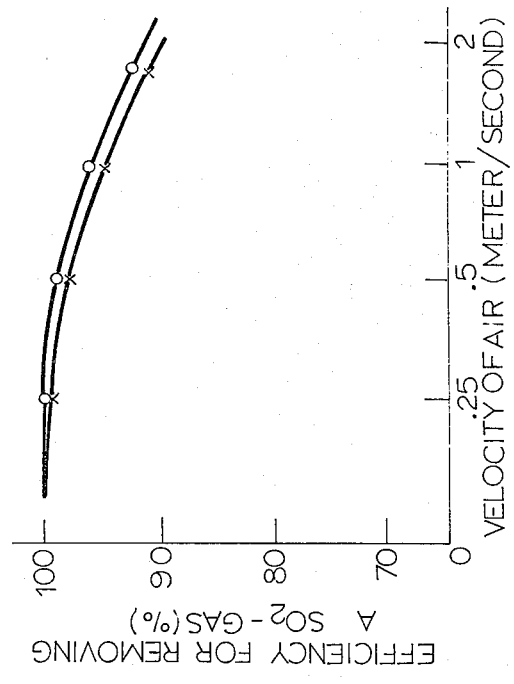
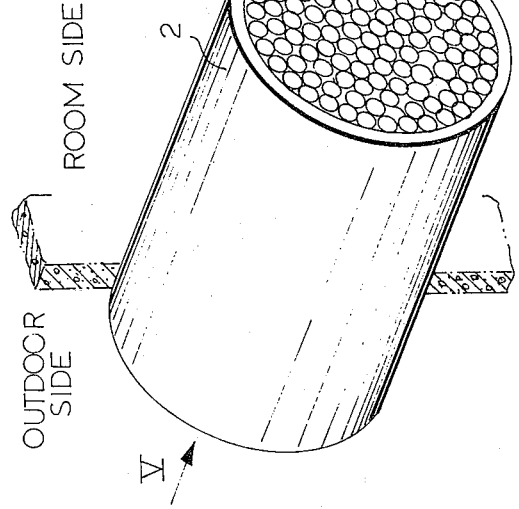

APPARATUS COMPRISING A PLURALITY OF CHEMICALLY TREATED ABSORPTION PLATES FOR INJURIOUS GASES CONTAINED IN THE AIR

CROSS REFERENCE TO RELATED APPLICATION

This is a continuation-in-part of applicants copending application Ser. No. 207,100, filed Dec. 13, 1971, now abandoned.

BACKGROUND OF INVENTION

It is well known that certain injurious gases or acidic mist are contained in the air. Recently, in some cities and factory districts, such injurious gases are increasing more and more in the air so as to exceed their allowable limits as far as the health of the human body is concerned. It thus becomes a serious problem, from the medical standpoint, to live in such a city or a factory district for many years, even if such injurious gases are present in the air in very small amounts. Therefore, it is earnestly desired to develop a device for purifying the ambient atmosphere contaminated with the injurious gases and mist.

SUMMARY OF THIS INVENTION

This invention relates to a device for removing acidic and injurious gases, such as a sulfur dioxide gas and a hydrogen sulfide gas, or acidic mist contained in the air, which comprises a plurality of absorption plates which are impregnated with an alkaline substance and spaced at desirable intervals so as to pass air through the space between said absorption plates under a low pressure resistance in order to decontaminate the air entering into the indoors, the surfaces of said absorption plates being always maintained in a wet state so that said acidic and injurious gases or said acidic mist are neutralized by said alkaline substance with high efficiency for a prolonged period of time and wherein the alkaline substance is tightly adhered to said absorption plates.

The essential features and the merits of the present invention will become obvious from the following description by referring to the accompanying drawings.

EXPLANATION OF DRAWINGS

FIG. 1 shows a perspective view of a device for removing acidic and injurious gases contained in the air which is used as an embodiment of this invention.

FIG. 2 shows two curves of which the curve A indicates the efficiency for removing acidic and injurious gases contained in the air when the device as shown in FIG. 1 is used and the curve B indicates the efficiency for removing such an acidic and injurious gas when the device as shown in FIG. 1 is used in which the absorption plates are not impregnated with a wetting agent.

FIGS. 3 to 7 show the perspective views of other types of devices for removing acidic and injurious gases contained in the air which are used as the other embodiments of this invention.

FIG. 8 shows the curve indicating the efficiency for removing acidic and injurious gases contained in the air when the ambient atmosphere is passed through the heat-exchange element as shown in FIG. 7.

DESCRIPTION OF THE PREFERRED EMBODIMENTS

Referring to FIG. 1, it shows a device for removing acidic and injurious gases contained in the air as an embodiment of this invention. In FIG. 1, the numeral 1 represents a plurality of absorption plates, namely as many as about 100 plates, which are made of a material such as paper, asbestos paper or unwoven textile and have a size of 30 centimeters in length and 12 centimeters in width. Such absorption plates are supported by frame plates 8 and 8, which are made of metal or plastics and disposed, at upper and lower ends of the device, at intervals of about 1.9 millimeters. The material used in constructing the absorption plates is impregnated with 210 grams of an alkaline substance such as sodium carbonate or potassium carbonate or calcium hydroxide and 200 grams of a viscous, hygroscopic wetting agent to render the material suitably hygroscopic, such as glycerine or ethylene glycol or propylene glycol, per one liter of the material by which the absorption plate 1 is constructed.

When the outdoor air, which is contaminated with about 0.1 ppm of an acidic and injurious gas such as a sulfur dioxide gas, is passed through the space between the absorption plates 1 at a velocity of about 0.1 cubic meter per second from the left hand to the right hand as shown by the arrow I, the outdoor air comes into contact with the absorption plates, while the injurious sulfur dioxide gas is neutralized by the alkaline substance. The thus-decontaminated air moves out from the right hand end of the absorption plates and enters the indoors.

FIG. 2 shows the curve A indicating the efficiency for removing acidic and injurious $SO_2$-gas contained in the air when the device as shown in FIG. 1 is used. When air is passed through the device at a velocity of below two meters per second, the $SO_2$-gas is removed with an efficiency of above 90%. It was found that the efficiency has nothing to do with temperatures and humidity of air and the concentration of the $SO_2$-gas contained in the air. Also it was found that the efficiency is reduced from a 90 to a 70% after the device is operated for 2.2 to 2.7 years by passing air through the device at a velocity of below two meters per second for 10 hours per day. Further it was found that the efficiency is reduced from a 70 to a 30% after the device is operated for an additional 1 month. Therefore, is it considered that the life of the device is about 2 years and that the absorption plates must be replaced after the device is operated for 2 years.

The device as shown in FIG. 1 comprises flat plate-like absorption plates which are spaced at desirable intervals, but it should be understood that such a flat plate-like absorption plate can be modified into various types as indicated in FIGS. 3, 4 and 5 in order to achieve the same actions and effects as those achieved by the device as shown in FIG. 1.

Referring to FIG. 3, it shows a plurality of absorption plates 1' which are laminated. On one surface of each of the absorption plates, there is provided a plurality of projection parts longitudinally in parallel in order to increase the area contacted with air which is passed through the space between the absorption plates 1' from the left hand (or the outdoor side) to the right hand (or the room side) as shown by the arrow III.

Referring to FIG. 4, it shows a cylinder which is constructed by winding the absorption plate 1' which is provided with a plurality of projection parts longitudinally in parallel on one side of said plate and air is passed through the space between the absorption plates 1' from the left hand to the right hand as shown by the arrow IV.

Referring to FIG. 5, it shows a small size tubular body 1″ which is constructed by an absorption plate which is made of paper or asbestos paper impregnated with an alkaline substance and a wetting agent as shown in FIG. 1. Many of the small size tubular bodies 1″ are tied up into a bundle and the bundle is packed in a large size glass tube 2. An acidic and injurious gas-containing air is passed through the small size tubular bodies 1″ from the left hand to the right hand as shown by the arrow V, while the acidic and injurious gas is removed from such contaminated air.

Now, it is understood that the absorption plates can act as a heat-exchanger when they are used in a manner as indicated in FIG. 6 because the paper or the asbestos paper or unwoven textile used in making the absorption plates as shown in FIG. 1 has heat-conductibility and moisture-permeability.

Referring to FIG. 6, it shows a plurality of absorption plates 1 which are made of a heat-conductive and moisture-permeable paper or asbestos paper or the like impregnated with an alkaline substance and a hygroscopic wetting agent, and spaced at desirable intervals to form a plurality of layers. Also, FIG. 6 shows a plurality of interposition plates 3 which are made of a metal plate or a plastic plate and formed into ripples. The interposition plates 3 are interposed in the space between the absorption plates 1 so that each of the ripples is placed alternately by changing its direction by an angle of 90° so as to permit the passage of indoor air, which leaves the indoors as shown by the arrow VIe. The outdoor air, enters the indoors as shown by the arrow VIs, through the space between the absorption plates 1 alternately by a crossing angle of 90°, while the acidic and injurious gases are neutralized by the alkaline substance contained in the absorption plates 1. Simultaneously, the outdoor air enters the indoors without mixing with the indoor air because the decontaminated air is supplied with moisture and heat contained in the indoor air or the decontaminated air is dried and cooled by the indoor air.

Also, it is understood that a heat-exchange element as shown in FIG. 7 can also act to remove the acidic and injurious gases contained in the air without using the alkaline substance contained in the material, when the heat-exchange element is constructed with the paper or asbestos paper. This is because the paper or asbestos paper is contacted with air containing a high concentration of the acidic and injurious gases on one side and is simultaneously contacted with air containing a low concentration of the acidic and injurious gases on the other side of it, and the acidic and injurious gases migrate through said paper from the former air to the latter air.

Now, referring to FIG. 7, it shows the main element 4 for removing the acidic and injurious gases contained in the air and the heat-exchange element 5 which acts subsidiarily to remove the acidic and injurious gases and also it acts as a heat-exchanger. The main element 4 is constructed of the absorption plates 1, which are spaced at desirable intervals as shown in FIG. 1 and the heat-exchange element 5 is placed in front of the main element 4 and it is constructed by a plurality of partition plates 6, which are spaced at desirable intervals to form a plurality of layers, and a plurality of interposition plates 7. The partition plates are made of a heat-conductive and moisture-permeable paper or asbestos paper and the interposition plates are made of a craft paper and formed into ripples. The interposition plates 7 are interposed in the space between the partition plates 6 so that each of the ripples is placed alternately by changing its direction by an angle of 90° so as to pass the indoor air, which leaves the indoors as shown by the arrow VIIe. The outdoor air, enters the indoor room as shown by the arrow VIIs, through the space between the partition plates 6, alternately by a crossing angle of 90°. The main element 4 and the heat-exchange element 5 are placed in the frame 9 which is made of metal or plastics. The outdoor air contaminated with the acidic and injurious gas, such as a sulfur dioxide gas, is passed through the partition plates 6 of the heat-exchange element 5, while the outdoor air is maintained at conditions similar to the temperature and humidity of the indoor air. This is because the outdoor air is supplied with moisture and heat contained in the indoor air or dried and cooled by the indoor air due to the migration of heat and moisture between the outdoor air and the indoor air. Simultaneously, a part of the acidic and injurious gas is passed through the partition plates 6 and said gas is diffused into the indoor air which leaves by way of the heat-exchange element 5.

In such a case, it goes without saying that a different concentration of the $SO_2$-gas exists on both sides of the partition plate 6 because the outdoor air contains the acidic and injurious gas in a concentration higher than that of the $SO_2$-gas contained in the indoor air.

The efficiency of the heat-exchange element for removing the $SO_2$-gas is illustrated by the curve as shown in FIG. 8 and it is noted that about 30% efficiency is achieved. In this case, the contaminated outdoor air is passed through the heat-exchange element 5 and then the incompletely decontaminated air can be passed through the main element 4 for obtaining air free of the acidic and injurious gases and such decontaminated air enters the indoors.

From the foregoing, it is obvious that the acidic and injurious gas-containing air can be passed through the space between the absorption plates along the surfaces without pressure loss and also the acidic mist and also the acidic and injurious gases contained in the air can be neutralized by the alkaline substance for a prolonged period of time because the absorption plates 1 are impregnated with the alkaline substance and the wetting agent, such as glycerine or ethylene glycol or propylene glycol, for maintaining the surfaces of the absorption plates in a wet state. This is proved by the curve A as shown in FIG. 2 as compared with the curve B which indicates the efficiency for removing the $SO_2$-gas contained in the air when the absorption plates are not impregnated with the wetting agent.

Also the alkaline substance can be adhered tightly to the absorption plates 1 because they are impregnated with a viscous wetting agent such as glycerine, ethylene glycol or propylene glycol.

Further the outdoor air, which enters the indoors, and the indoor air, which passes outdoors, can be passed alternately through the space between the absorption plates for neutralizing the acidic and injurious gases with the alkaline substance contained in the absorption plates and also for feeding the outdoor air into the indoors without mixing it with the indoor air at conditions similar to the temperature and humidity of the indoor air. This is because the outdoor air is supplied with moisture and heat contained in the indoor air or the outdoor air is dried and cooled by the indoor air because the absorption plates 1 are hygroscopic and made of a heat-conductive and moisture-permeable paper or asbestos paper or unwoven textile rendered hygroscopic by impregnation with a hygroscopic wetting agent.

Still further, as the paper and the asbestos paper, of which the absorption plates 1 are made, have inherent gas-permeability, the acidic and injurious gases contained in the outdoor air can partially be diffused into the indoor air which passes outdoors when they are passed through the partition plates 6 of the heat-exchange element 5 which is placed in front of the main element 4. This is because the partition plates 6 are made of the paper or the asbestos paper which is the same as that of the absorption plates 1, so that the pre-decontaminated outdoor air can be passed through the main element 4 for neutralizing the remaining acidic and injurious gases with the alkaline substance contained in the absorption plates.

What we claim is that:

1. A device for removing acidic and injurious gases such as a sulfur dioxide gas, a hydrogen sulfide gas or acidic mist contained in the air, which comprises a plurality of absorption plates, spacing means positioned for maintaining the absorption plates apart so as to form a plurality of layers and interposition plates which are interposed in the space between said plurality of layers so as to guide two directional flows of air having different temperatures and humidities from one another alternately into said space, said absorption plates being made of a material selected from the group consisting of paper, asbestos paper, cloth or textile, said material being impregnated with a hygroscopic wetting agent to render the material hygroscopic, selected from the group consisting of glycerine, ethylene glycol or propylene glycol and an alkaline substance selected from the group consisting of hydroxides and carbonates of alkali metals and alkaline earth metals to neutralize said acidic and injurious gases or said acid mist.

2. A device for removing acidic and injurious gases such as sulfur dioxide gas, a hydrogen sulfide gas or acidic mist contained in the air, which comprises a plurality of absorption plates, spacing means positioned for maintaining the absorption plates apart to form a plurality of layers so as to pass air through the space between said layers and a heat-exchange element comprising a plurality of partition plates, spacing means positioned for maintaining the partition plates apart to form a plurality of layers and interposition plates which are interposed in the space between said plurality of layers of partition plates so as to guide two directional flows of air alternately into the space between said layers, said absorption plates being made of material selected from the group consisting of paper, asbestos paper, cloth or unwoven textile, said material being impregnated with a hygroscopic wetting agent to render said material hygroscopic, selected from the group consisting of glycerine, ethylene glycol or propylene glycol and an alkaline substance selected from the group consisting of hydroxides and carbonates of alkali metals and alkaline earth metals to neutralize said acidic and injurious gases or said acidic mist, said partition plates being made of a heat-conducting and moisture-permeable material which is the same material used in the absorption plates, said heat-exchange element being placed on the air-inlet side of said absorption plates and one of said two directional flows of air being passed through said space between said layers of said absorption plates after said two directional flows of air have been passed through said heat-exchange element.

3. A device for removing acidic and injurious gases such as a sulfur dioxide gas, a hydrogen sulfide gas or an acidic mist contained in the air, which comprises a plurality of absorption plates, spacing means positioned for maintaining the absorption plates at intervals of about 1.9 millimeters to form a plurality of layers so as to pass air through the space between said layers, said absorption plates being made of a material selected from the group consisting of paper, asbestos paper, cloth or unwoven textile, and said material being impregnated with 200 grams of a viscous, hygroscopic wetting agent to render said material hygroscopic, selected from the group consisting of glycerine, ethylene glycol or propylene glycol per one liter of said material and 210 grams of an alkaline substance selected from the group consisting of hydroxides and carbonates of alkali metal and alkaline earth metals per one liter of said material to neutralize said acidic and injurious gases or said mist.

4. A device according to claim 3, wherein the acidic and injurious gases or acidic mist contained in the air flows between the absorption plates at a flow rate of 0.1 $m^3$ and wherein the number of absorption plates is 100, each absorption plate being 30 centimeters in length and 12 centimeters in width.

* * * * *